(12) United States Patent
Eftekharzadeh (10) Patent No.: US 10,047,511 B2
(45) Date of Patent: Aug. 14, 2018

(54) TWO LEVEL STORMWATER CHANNEL

(71) Applicant: Shahriar Eftekharzadeh, Torrance, CA (US)

(72) Inventor: Shahriar Eftekharzadeh, Torrance, CA (US)

(*) Notice: Subject to any disclaimer, the term of this patent is extended or adjusted under 35 U.S.C. 154(b) by 66 days.

(21) Appl. No.: 15/256,725

(22) Filed: Sep. 5, 2016

(65) Prior Publication Data

US 2016/0369491 A1    Dec. 22, 2016

(51) Int. Cl.
| | |
|---|---|
| *E03F 1/00* | (2006.01) |
| *E02B 5/00* | (2006.01) |
| *C02F 1/00* | (2006.01) |
| *E03F 5/04* | (2006.01) |
| *E03F 5/14* | (2006.01) |
| *E03F 3/04* | (2006.01) |
| *E03B 11/10* | (2006.01) |
| *C02F 103/00* | (2006.01) |

(52) U.S. Cl.
CPC .............. *E03F 1/003* (2013.01); *C02F 1/006* (2013.01); *E02B 5/00* (2013.01); *E03B 11/10* (2013.01); *E03F 3/046* (2013.01); *E03F 5/04* (2013.01); *E03F 5/14* (2013.01); *C02F 2103/001* (2013.01)

(58) Field of Classification Search
CPC ... E03F 1/00; E03F 1/002; E03F 1/003; E03F 3/046; E02B 5/00; E02B 5/02; E02B 13/00

USPC ...... 210/170.03, 170.08; 405/38, 43, 45, 46, 405/50, 118

See application file for complete search history.

(56) References Cited

U.S. PATENT DOCUMENTS

| | | | | |
|---|---|---|---|---|
| 4,523,613 A * | 6/1985 | Fouss | ...................... | E03F 1/003 405/45 |
| 4,561,801 A * | 12/1985 | Nantz | ....................... | E02B 5/00 405/118 |
| 5,248,225 A * | 9/1993 | Rose | ..................... | E04B 1/0007 405/38 |
| 5,810,510 A * | 9/1998 | Urriola | .................... | E03F 1/005 210/170.03 |
| 6,363,775 B1 * | 4/2002 | Varkovitzky | ............ | G01M 3/04 405/118 |
| 7,207,747 B1 * | 4/2007 | England | ................ | E02B 11/005 210/170.03 |
| 8,877,048 B1 * | 11/2014 | Owings | ................... | E03F 1/002 210/170.03 |

FOREIGN PATENT DOCUMENTS

| | | | |
|---|---|---|---|
| EP | 790360 | * | 8/1997 |
| EP | 2660400 | * | 11/2013 |
| EP | 2816163 | * | 12/2014 |
| EP | 2871296 | * | 3/2017 |

* cited by examiner

*Primary Examiner* — Christopher Upton (57) ABSTRACT

A method and apparatus for combined conveyance, detention, and infiltration of stormwater runoff.

2 Claims, 14 Drawing Sheets

TWO LEVEL STORMWATER CHANNEL

FIELD OF THE INVENTION

The present invention pertains to stormwater runoff conveyance, detention, and infiltration systems. In particular, the present invention provides a means of integrating detention and infiltration within stormwater channels.

BACKGROUND OF THE INVENTION

Detention of stormwater runoff from urban watersheds followed by either infiltration into the ground and/or treatment for quality improvement and beneficial use is becoming increasingly important as stormwater runoff is now considered a valuable water resource and environmental regulations limit the pollutant loads that storm drains can discharge into natural water bodies.

Current art diverts the stormwater runoff to an off-channel detention storage facility for infiltration into the ground and/or treatment for beneficial use. This often requires extensive civil works for the diversion, conveyance, and detention storage facilities and is contingent upon the availability of sufficient land for these facilities. The undertaking is often extensive and cost-prohibitive. One approach for both stormwater diversion and detention is to use inflatable rubber dams across the channel. This approach has limited detention utility because of limited dam height and the sloping nature of the channel, which only enables utilizing half the channel volume in the reach between the rubber dam and the backwater upstream.

Other than the limited in-channel detention storage created by small dams and gates, current art has largely overlooked the potential utility of the stormwater channel for purposes other than conveyance. This is particularly true for the space below the channel, which is only utilized for as the support for the channel bed and banks above. This is an anomaly in urban areas, which normally utilize the space below most facilities as parking structures, shopping centers, sport facilities, etc. Indeed, the space below the channel bed is the ideal location to house a detention storage facility for stormwater runoff, since conveyance to the facility would occur by gravity and there would not be a need for diversion. Depending on the ground formation and environmental suitability, the space below the channel bed may also be suitable for infiltration in addition to detention. The concept eliminates the need for finding a suitable off-channel site for detention, feasible conveyance alignment alternatives, and suitable diversion scheme and would greatly accelerate stormwater conservation while drastically increasing the stormwater protection capability of existing storm drain, since they would also incorporate sizeable detention storage.

Therefore, there is a need for and great benefits from a means of utilizing the vertical space below stormwater channels for stormwater runoff detention and infiltration. This would greatly enhance the utility of the land occupied by or allocated to stormwater channels and provide an effective and simple tool for stormwater management, conservation, water quality enhancement, while increasing the stormwater protection capacity of existing and future stormwater channels.

SUMMARY OF THE INVENTION

The present invention provides a solution for the above stated need with an apparatus and method that creates basins along and directly beneath the channel bed for stormwater runoff detention and infiltration, while providing a means of safe hydraulic communication between the storm channel and the detention/infiltrations basins below. The invention essentially creates a two-level stormwater channel with the upper level for conveyance and the lower level for detention and infiltration.

The invention consists of deliberately created void spaces along and below the invert of the storm channel bed, in the form of cascading longitudinal detention/infiltration basins. The basins resemble a long row of giant bath tubs buried into the channel bed with level beds and sloping rims flush with the channel invert. Consecutive basins are separated by certain intervals across which there is a step drop in the bed elevation of the downstream basin that equals the drop in the channel bed elevation along the basin length because of the channel slope. Separations may also be located where side channels and other storm drains join the stormwater channel to avoid detention and infiltration of the dry weather flow of such channels. Alternatively, an impervious channel bed may be used at such locations to interrupt the hydraulic communication between the channel and the basin below and/or secondary dry weather flow channels may be used to direct dry weather flows of side channels to the dry weather flow channel of the present invention. Where there is no infiltration, the basins may have slightly sloping beds and consecutive basins may be connected with pipes equipped with flow control devices that are normally closed and opened to enable complete gravity drainage after the event.

The channel bed serves as the interface between the conveyance channel above and the detention/infiltration basins below, over certain widths and lengths of the channel, enabling hydraulic communication between the two facilities. The interface may consist of graded rip rap to maintain channel bed stability and prevent bed erosion during stormwater flows resting on top of carefully graded granular material to serve as filter preventing migration of fines into the detention facility below. Alternatively, geotextiles may be used at the interface for either or both purposes of channel bed stabilization and filtration of stormwater runoff flow into the basins. The channel bed is supported by the basin ceiling, which may take a number of different forms as described below.

In one embodiment the entire void space of the basins created below the channel bed is used for detention using structural support walls. In this case, structural metal or plastic grating, either spanning the walls of the basins on either side or supported by intermediate walls may be used as the ceiling of the basins to support the filter and channel bed protection layer(s) above. In another embodiment, one or several lines of perforated pipe may be laid longitudinally inside the basins over a granular bed, and backfilled with granular material such as crushed stone up to the ceiling level. In this embodiment, the perforated pipes create most of the void space and serve as the main storage elements while the granular material provides structural support, additional voids for storage, and maintains hydraulic communication between the conveyance channel and the interior of the perforated pipe. Here, the filter layer is laid directly over the granular material followed by the channel bed erosion protection layer on top.

If infiltration is required and permitted per local soil conditions and pertinent environmental regulations, then it could be accommodated in both embodiments using a filter layer of either synthetic geotextiles or graded granular material on the wetted perimeter surface of the basins. If the purpose of detention is stormwater conservation for later access, treatment, and use i.e. without infiltration, then the basins would be lined with impervious liner and appropriate means of accessing the water stored in the cascade of basins would be incorporated into the design. Alternatively, non-perforated conduits may be used in lieu of perforated conduits to avoid the need for lining the basins. When using non-perforated conduits, one option is to use perforated risers at intervals to establish hydraulic communication between the channel and the conduit. Alternatively, one may use longitudinal slots along the tops of the conduits, similar to a slotted drain, with funneled inlet from the stream bed for hydraulic communication.

It is an object of the present invention to provide an apparatus and method for increasing the utility of stormwater conveyance channels by enabling them to also function as detention and infiltration facilities.

It is an object of the present invention to provide improved elements and arrangements by apparatus for the purposes described thereof, which is comparable in cost with existing systems, dependable, and fully effective in accomplishing its intended purposes.

These and other objects of the present invention will become readily apparent upon further review of the following specification and drawings.

DETAILED DESCRIPTION

Figure 1:
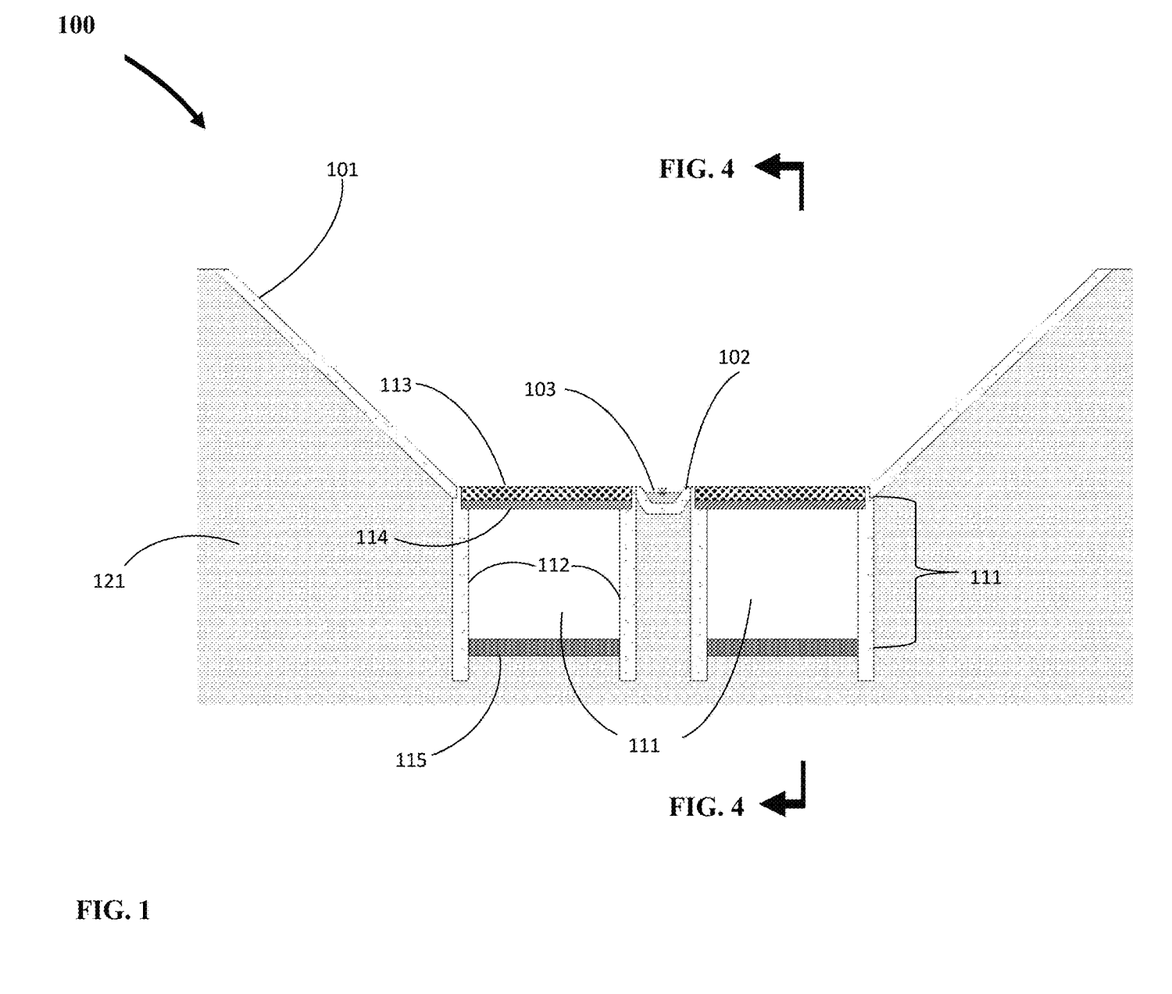
FIG. 1 is a cross section view of one embodiment of the present invention during dry weather conditions wherein concrete-box detention basins with permeable infiltration beds are accommodated below a stormwater channel bed.

Referring to FIG. 1 there is shown a cross section view of one embodiment of the present invention 100 during dry weather conditions wherein concrete-box detention basins 111 with permeable infiltration beds 115 are accommodated in the ground formation 121 below a stormwater channel bed 101. Infiltration layer 115 also serves as filter to prevent fines from surrounding ground migrating into basin 111 in case of flow reversal due to high ground water level. Structural metal or plastic grating 114 spans the walls of the basins 112 on either side and serves as the ceiling of the basins to support the filter and pervious channel bed protection layer 113 above and enable rapid hydraulic communication between the channel 101 and the basins 111 below. The stormwater channel may have a low flow channel 102 that conveys water 103 during dry weather conditions, which may be kept isolated from the basins 111 because of water quality concerns.

Figure 2:
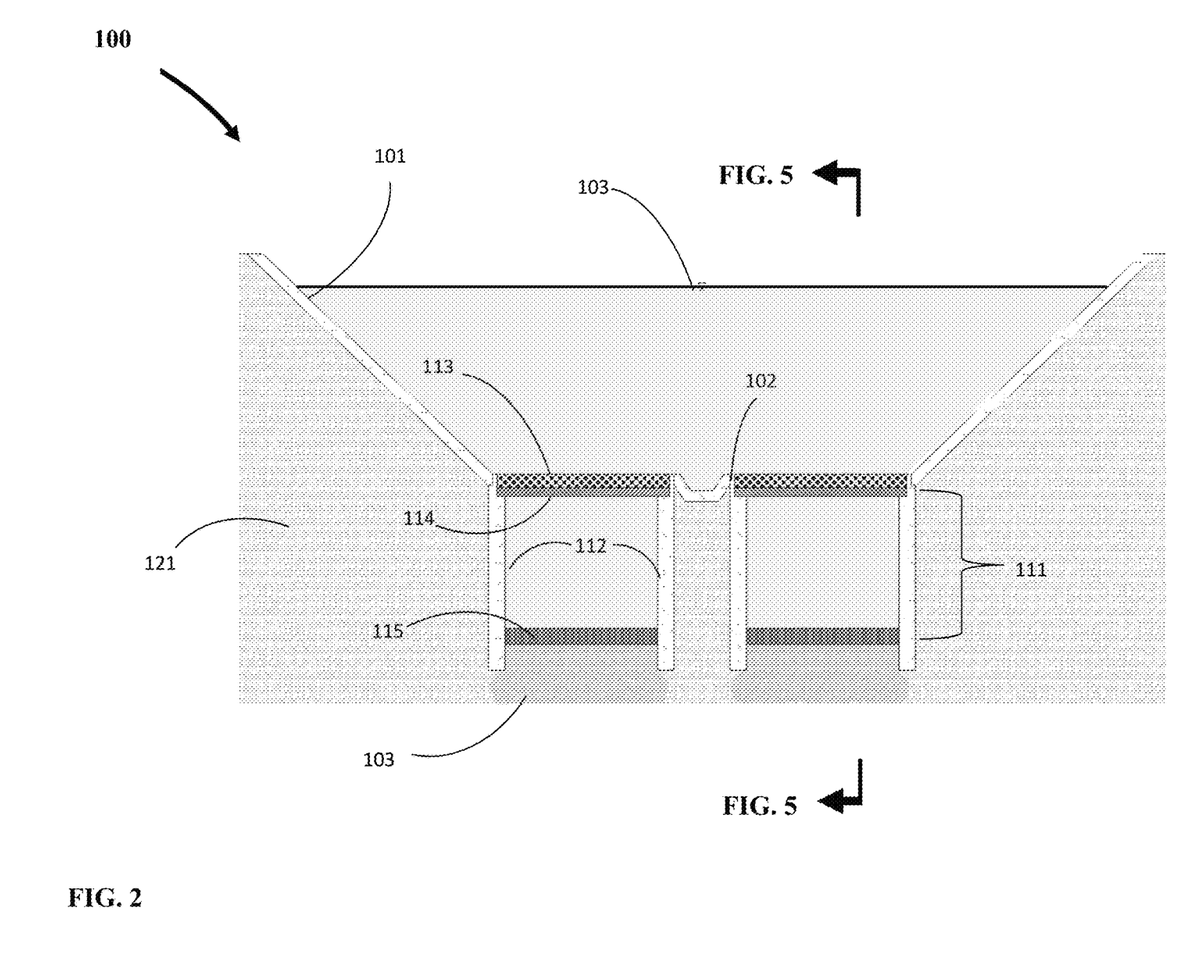
FIG. 2 is the same cross section view of the same embodiment of the present invention as in FIG. 1 during wet weather conditions.

FIG. 2 is the same cross section view of the same embodiment of the present invention 100 as in FIG. 1 during wet weather conditions. Flow in stormwater channel 101 exceed the capacity of low flow channel 102 and water 103 flows into the basins 111 via pervious bed 113 over grating 114 and starts infiltrating into ground formation 121. The level of water 103 only elevates above the channel bed 113 once basins 111 are full and stormwater runoff inflow into the channel 101 exceeds infiltration rate through basin permeable perimeter 115.

Figure 3:
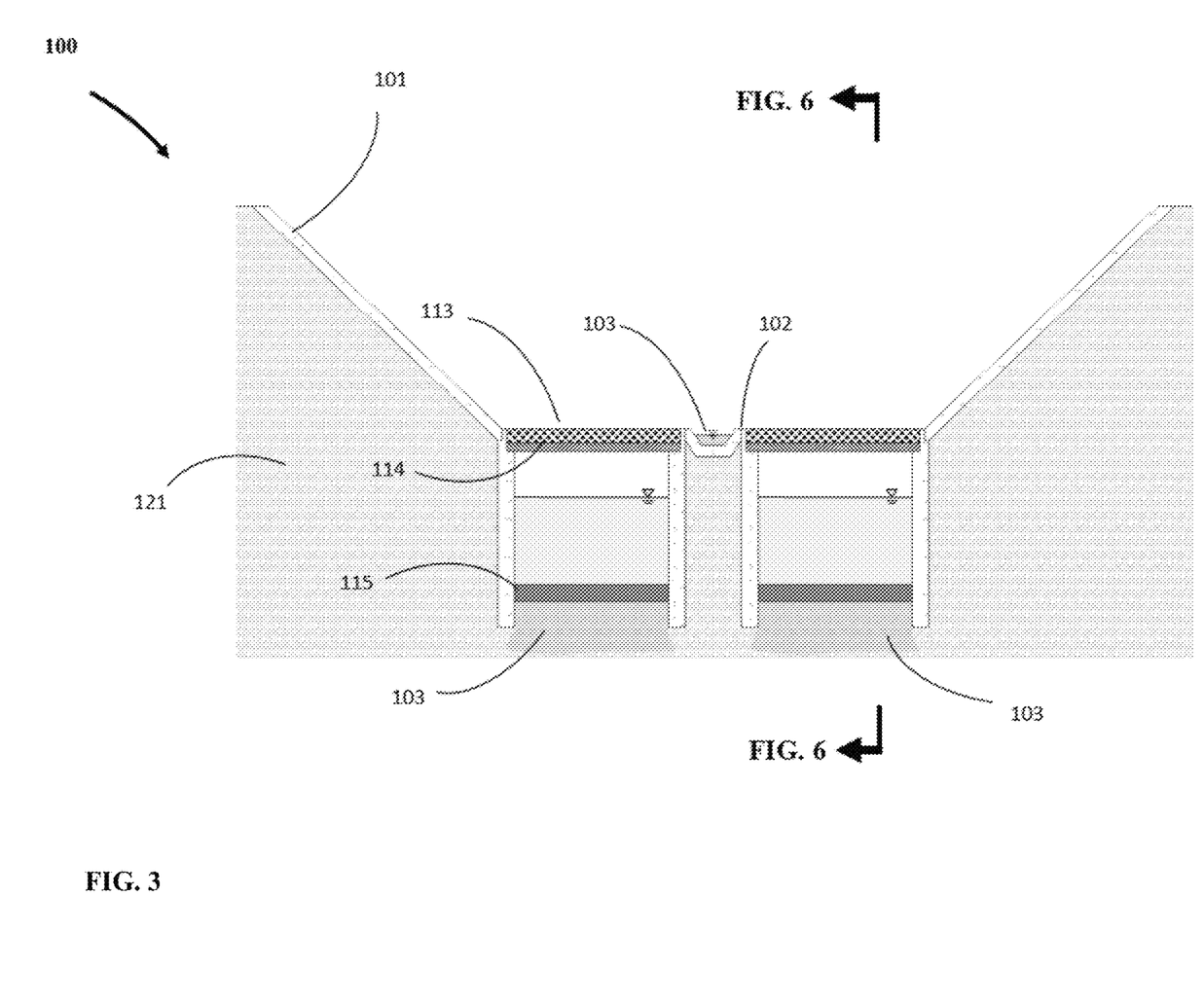
FIG. 3 is the same cross section view of the same embodiment of the present invention as in FIG. 1 shortly after a wet weather event.

FIG. 3 is the same cross section view of the same embodiment of the present invention 100 as in FIG. 1 shortly after a wet weather event. Channel 101 is dry except for dry weather flow in low flow channel 102, while there is water 103 captured in detention basins 111 below invert of channel 101, which continues infiltrating into the ground formation 121 until there is no longer any water 103 in basins 111.

Figure 4:
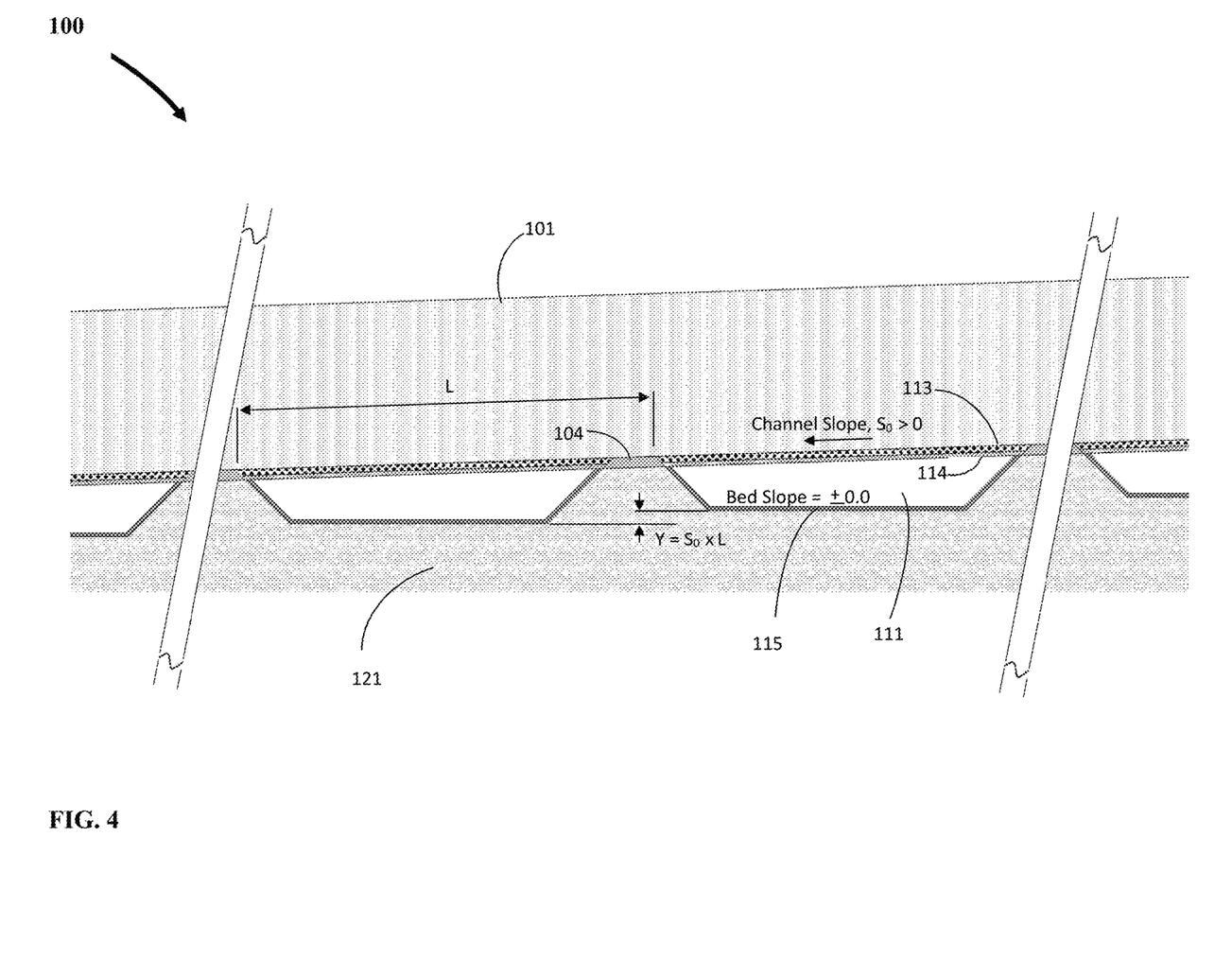
FIG. 4 is a longitudinal profile view of the same embodiment of the present invention as in FIG. 1 during dry weather conditions wherein a cascade of separate concrete-box detention basins with permeable infiltration beds are accommodated below a stormwater channel bed.

FIG. 4 is a longitudinal profile view of the same embodiment of the present invention 100 as in FIG. 1 during dry weather conditions wherein a cascade of separate concrete-box detention basins 111 with permeable infiltration beds 115 are accommodated below a stormwater channel bed 101. Consecutive basins are separated by certain intervals 104 across which there is a step drop Y in the bed elevation of the downstream basin that equals the drop in the channel bed elevation along the length of basin 111 plus separation 104, because of the channel slope.

Figure 5:
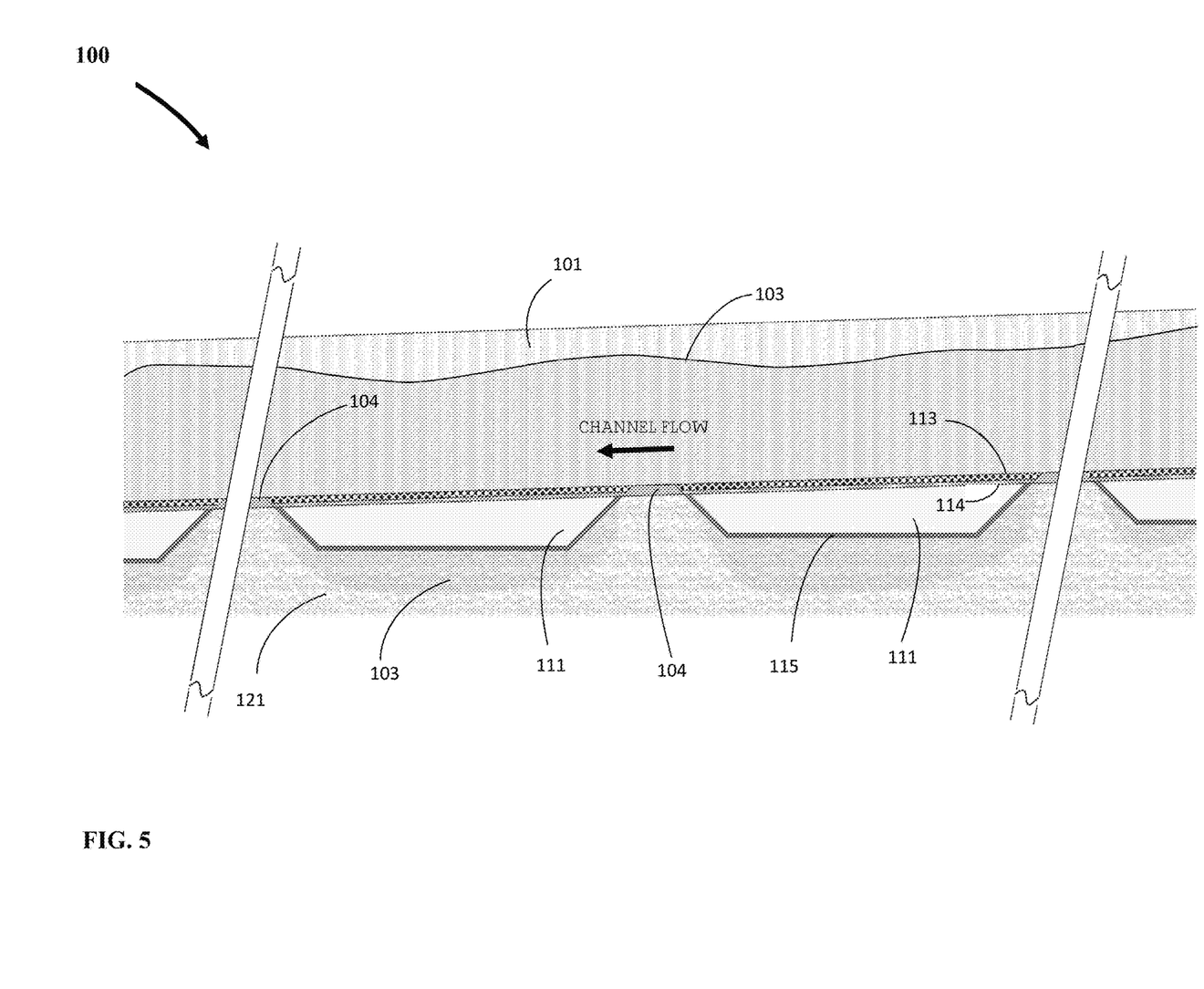
FIG. 5 is the same longitudinal profile view of the same embodiment of the present invention as in FIG. 1 during wet weather conditions.

FIG. 5 is the same longitudinal profile view of the same embodiment of the present invention as in FIG. 1 during wet weather conditions. Level of water 103 in channel 101 is above channel invert 113 and basins 111 are filled with water 103, while there is infiltration across permeable boundary 115 into ground 121.

Figure 6:
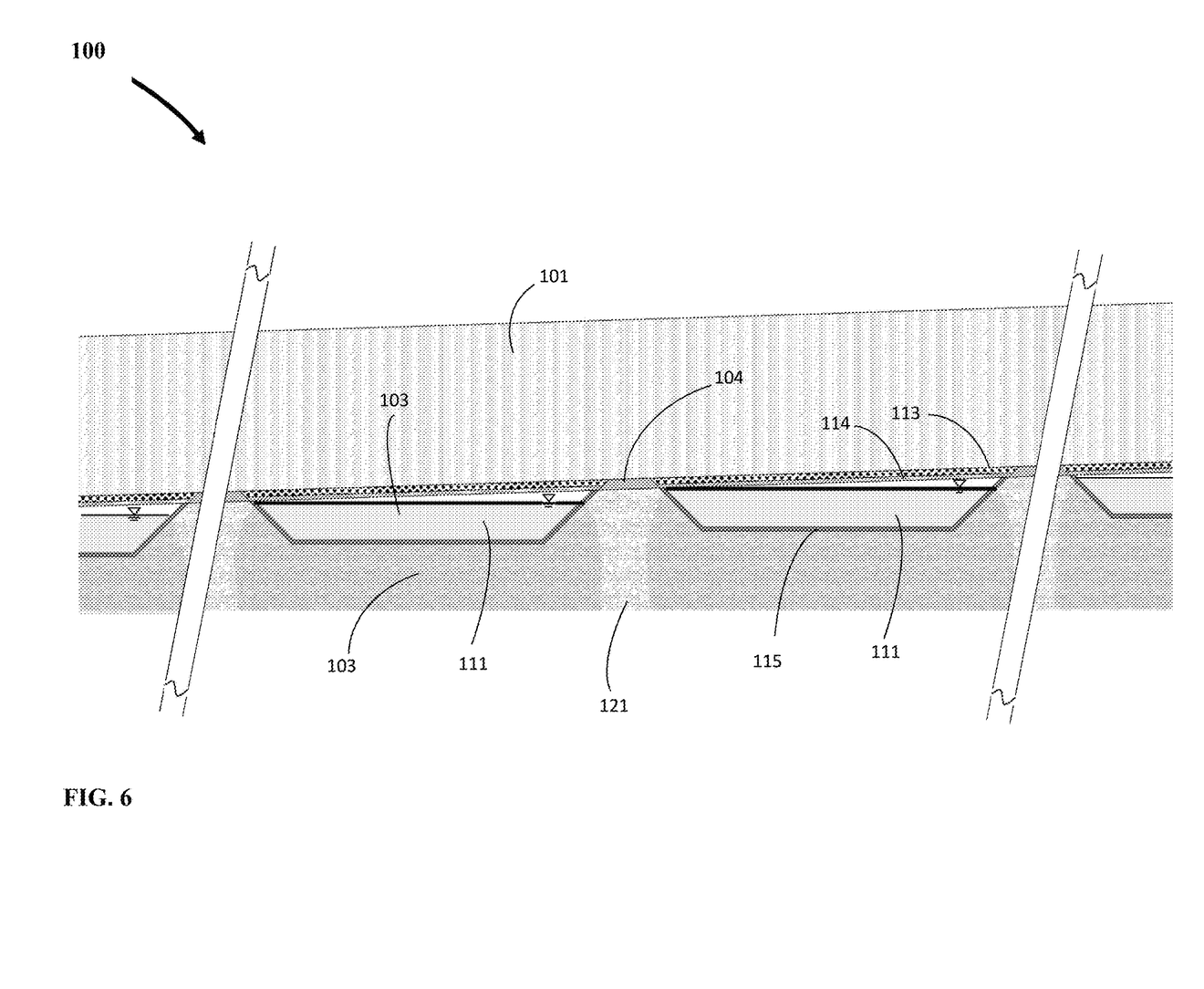
FIG. 6 is the same longitudinal profile view of the same embodiment of the present invention as in FIG. 1 shortly after a wet weather event.

FIG. 6 is the same longitudinal profile view of the same embodiment of the present invention as in FIG. 1 shortly after a wet weather event. Level of water 103 in channel 101 has dropped to below channel invert 113, while basins 111 contain water 103 that continues infiltrating into ground 121 across permeable boundary 115.

Figure 7:
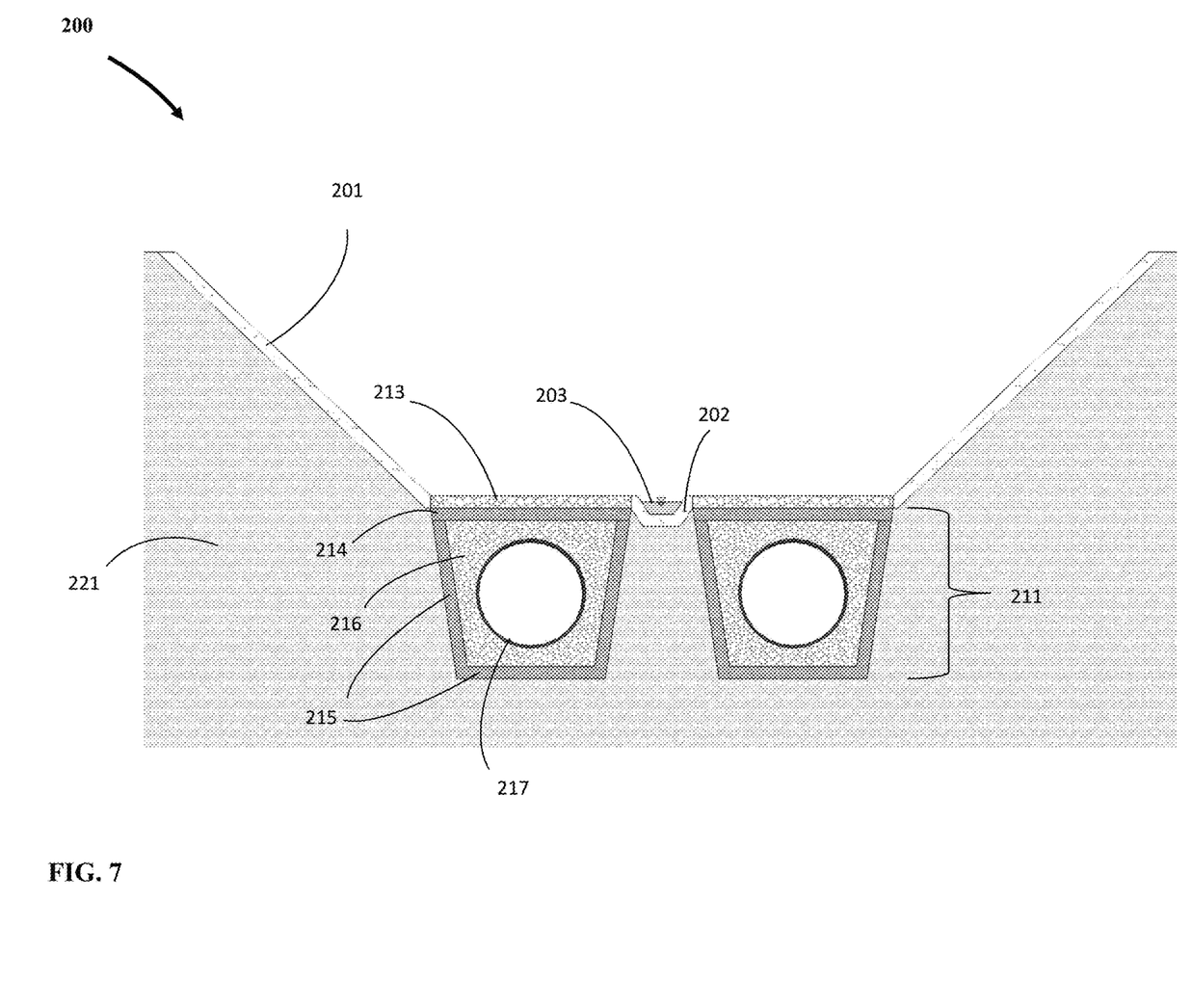
FIG. 7 is a cross section view of another embodiment of the present invention during dry weather conditions wherein perforated pipes with crushed stone backfill in permeable-parameter excavated trenches are accommodated below a stormwater channel bed to serve as detention-infiltration basins.

FIG. 7 is a cross section view of another embodiment 200 of the present invention during dry weather conditions wherein perforated pipes 217 with crushed stone backfill 216 in permeable-parameter excavated trenches 215 are accommodated below a stormwater channel 201 to serve as detention-infiltration basins 211. Infiltration layer 215 also serves as filter to prevent fines from surrounding ground migrating into basin 211 in case of flow reversal due to high ground water level. The channel bed 213 over basins 211 is highly pervious and may be comprised of rip rap laid over a graded stone filter bed 214. The stormwater channel 201 may have a low flow channel 202 that conveys water 203 during dry weather conditions, which may be kept isolated from the basins 211 because of water quality concerns.

Figure 8:
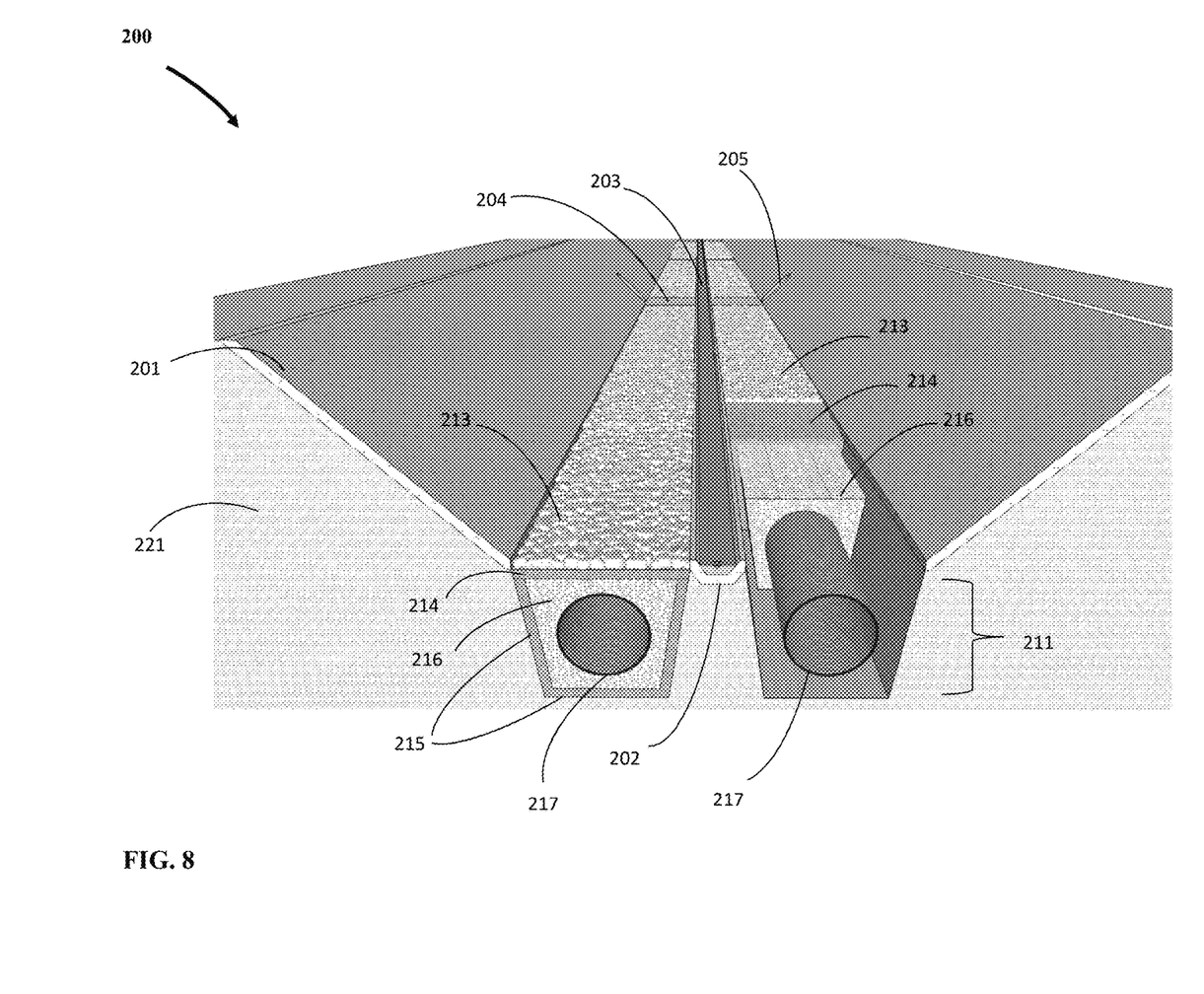
FIG. 8 is a frontal perspective view of the same embodiment of the present invention as in FIG. 7 during dry weather conditions showing how the perforated pipes with crushed stone backfill in permeable-parameter excavated trenches may be accommodated below a stormwater channel bed to serve as detention-infiltration basins.

FIG. 8 is a frontal perspective view of the same embodiment 200 of the present invention as in FIG. 7 during dry weather conditions showing how the perforated pipes 217 with crushed stone backfill 216 in permeable-parameter excavated trenches 215 may be accommodated below a stormwater channel 201 to serve as detention-infiltration basins 211. Consecutive basins 211 along channel 201 are separated over a certain reach 204 where there is a step drop in the bed elevation of the downstream basin. To avoid capture and infiltration of dry weather flows from side streams 205, basin separations 204 may be located where side stream 205 enter the main channel 201, or the channel bed may be made impervious at such locations.

Figure 9:
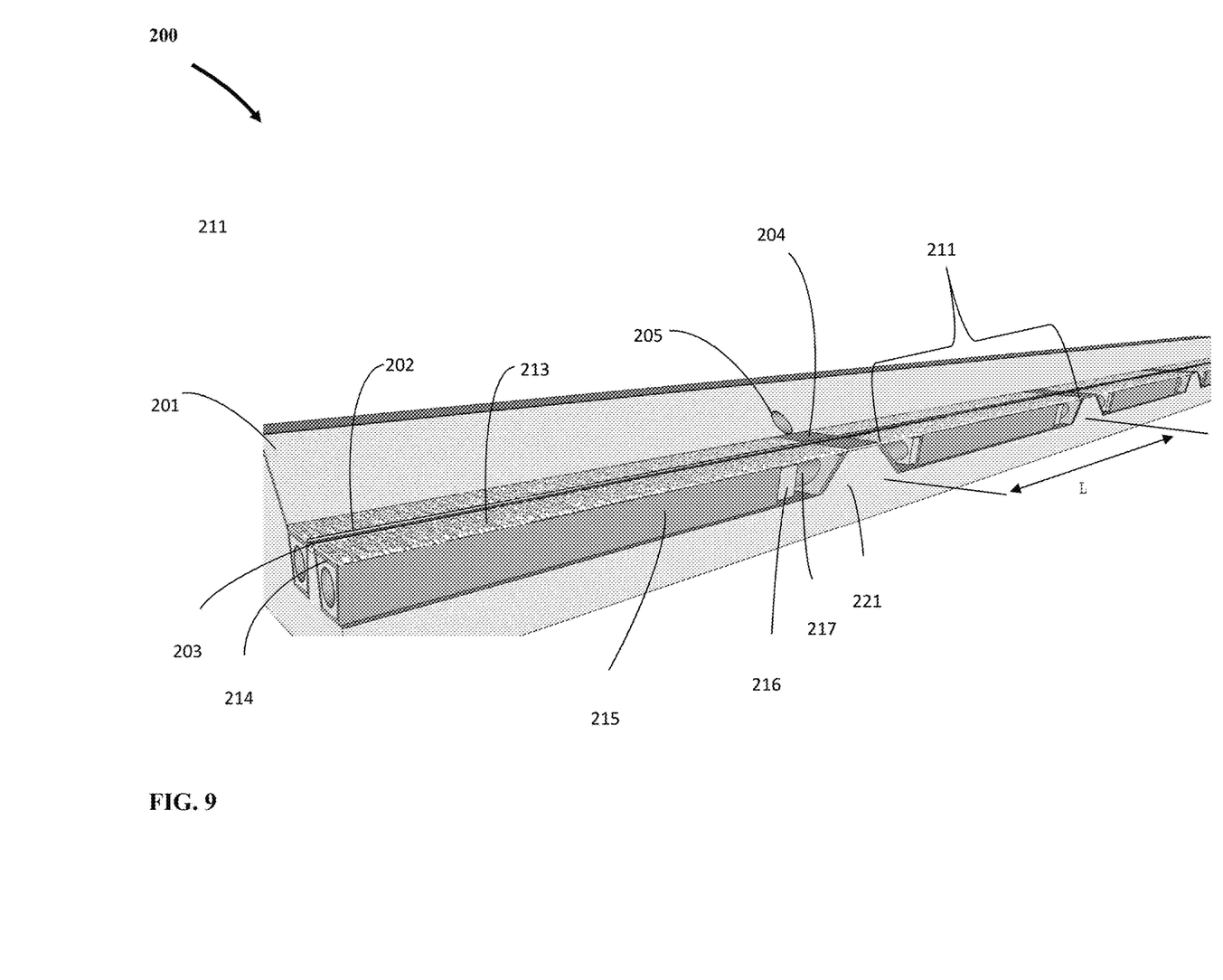
FIG. 9 is a longitudinal perspective view of the same embodiment of the present invention as in FIG. 7 during dry weather conditions showing the separate detention-infiltration basins comprised of perforated pipes with crushed stone backfill in permeable-parameter excavated trenches accommodated below a stormwater channel bed.

FIG. 9 is a longitudinal perspective view of the same embodiment 200 of the present invention as in FIG. 7 during dry weather conditions showing the separate detention-infiltration basins 211 comprised of perforated pipes 217 with crushed stone backfill 216 in permeable-parameter excavated trenches 215 accommodated below stormwater channel 201 bed. Consecutive basins 111 are separated over certain reach 204, which may be located where there is a side channel 205 entering the main channel 201 to direct their dry weather flow in the low flow channel 202 of the main channel. There is a drop in bed elevation of the consecutive basins 211 to compensate for the bed slope of the stormwater channel 201, making the basins deepest at the upstream end. Basin lengths L is set to limit the excavation depth of the basin at upstream end to within manageable and safe levels.

Figure 10:
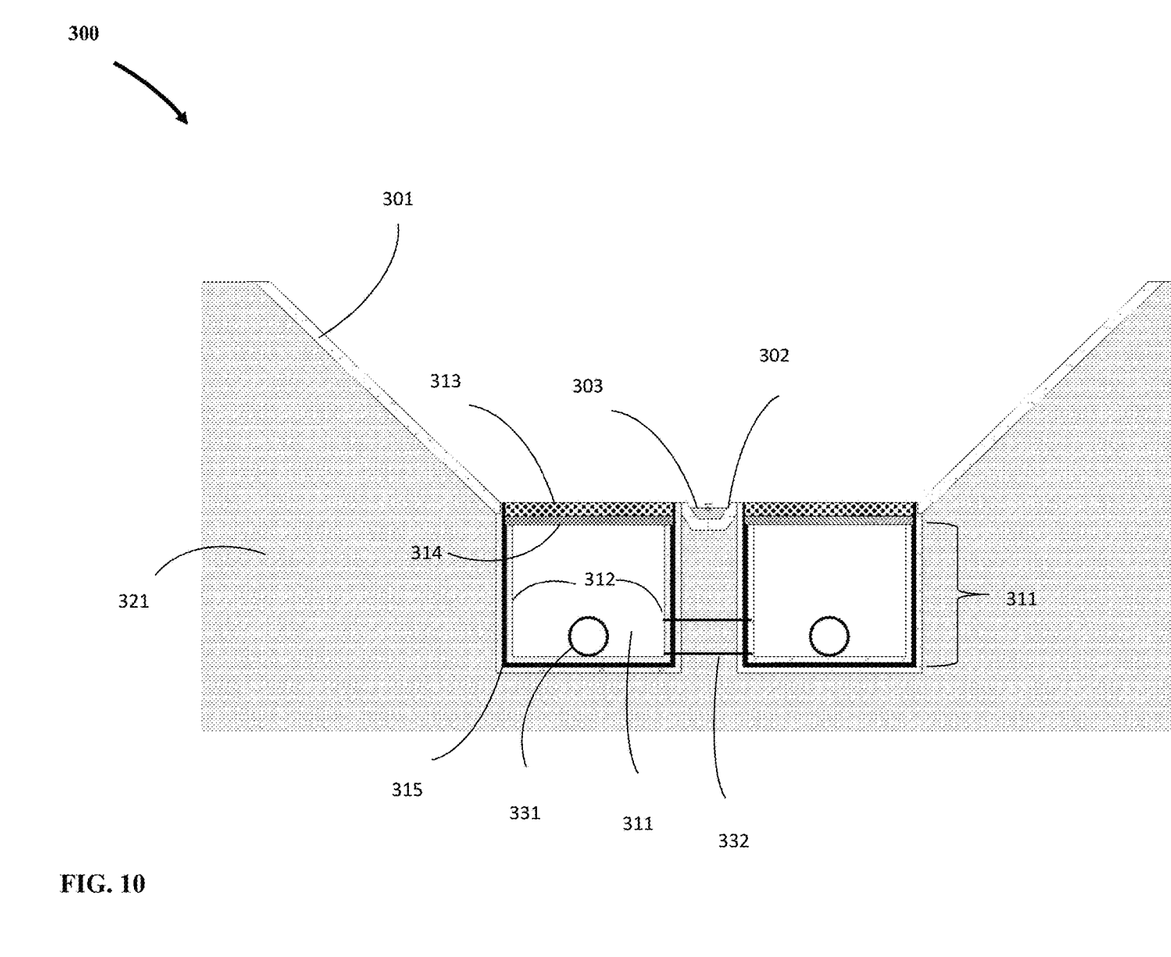
FIG. 10 is a cross section view of another embodiment of the present invention during dry weather conditions wherein interconnected concrete-box detention basins with impervious liner for stormwater runoff conservation are accommodated below a stormwater channel bed.

FIG. 10 is a cross section view of another embodiment 300 of the present invention during dry weather conditions wherein interconnected concrete-box detention basins 311 with impervious liner 315 are accommodated below a stormwater channel 301 for stormwater runoff conservation. Structural metal or plastic grating 314 spans the walls of the basins 312 on either side and serves as the ceiling of the basins to support the filter and pervious channel bed protection layer 313 above and enable rapid hydraulic communication between the channel 301 and the basins 311 below. The stormwater channel may have a low flow channel 302 that conveys water 303 during dry weather conditions, which may be kept isolated from the basins 311 because of water quality concerns. There may be longitudinal pipes 331 equipped with normally closed flow control devices (not shown) that connect consecutive basins with different bed elevations along channel 301, while adjacent basins with same bed elevation may be connected laterally by level pipes 332.

Figure 11:
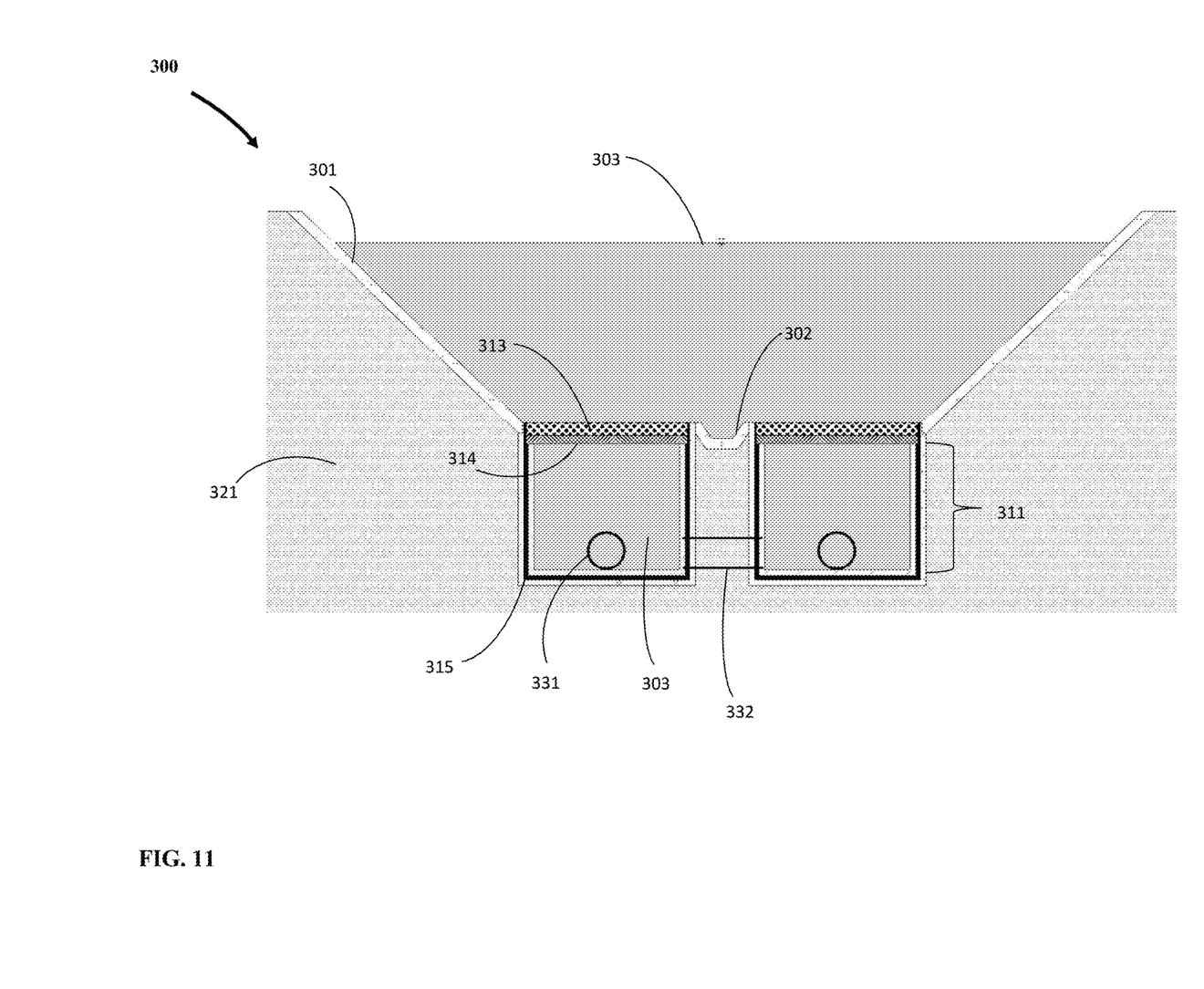
FIG. 11 is the same cross section view of the same embodiment of the present invention as in FIG. 10 during wet weather conditions.

FIG. 11 is the same cross section view of the same embodiment 300 of the present invention as in FIG. 10 during wet weather conditions. Flow exceed capacity of low flow channel 302 and water 303 flows into the basins 311 via pervious bed 113 over grating 114 and store inside basins 311 prevented from infiltration into ground 321 by impervious basin perimeter 315. With basins 311 filling, the level of water 303 only elevates above the channel bed 313 to provide sufficient hydraulic head for the flow into the basins and rises to flow in the channel once basins 311 are full.

Figure 12:
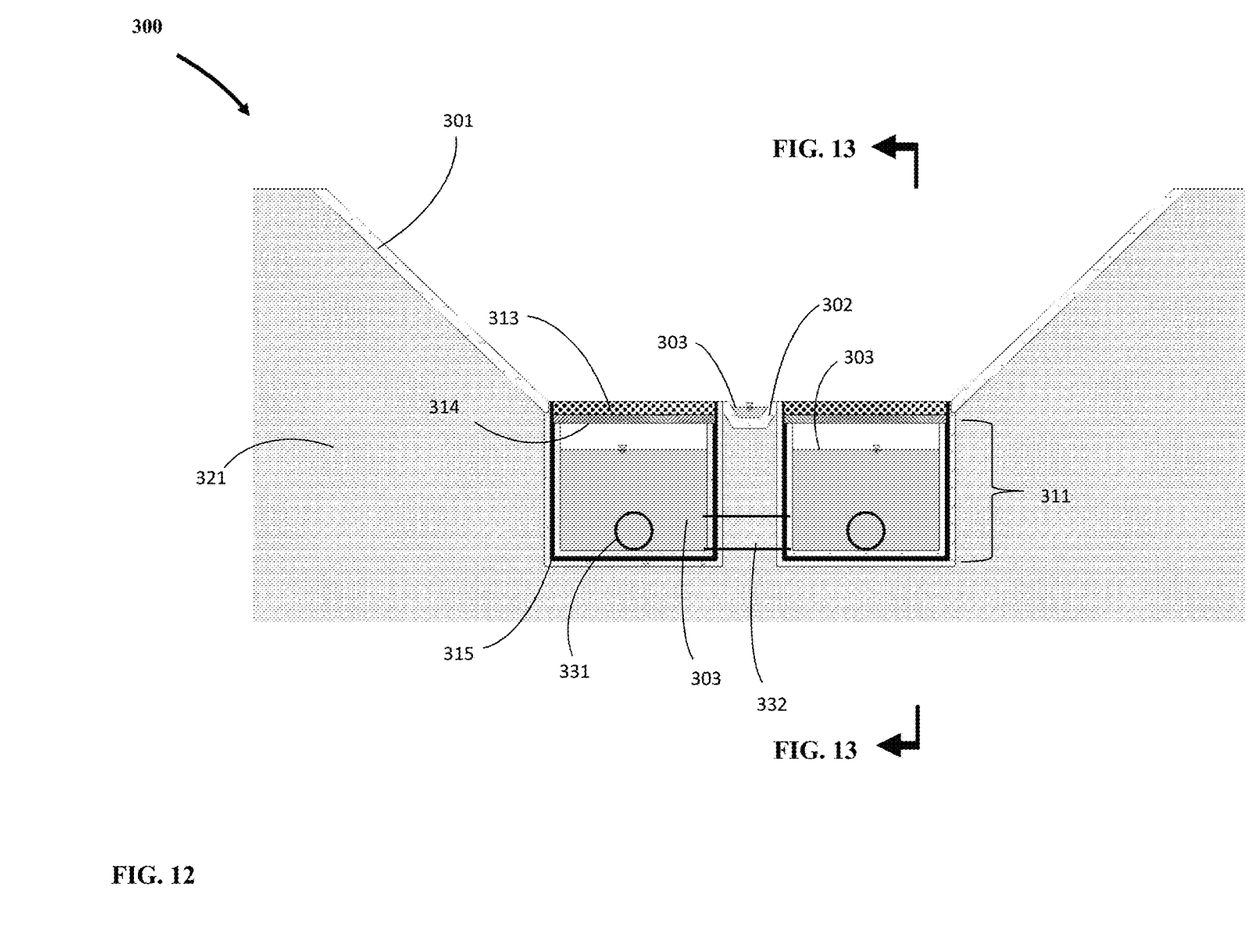
FIG. 12 is the same cross section view of the same embodiment of the present invention as in FIG. 10 shortly after a wet weather event.

FIG. 12 is the same cross section view of the same embodiment 300 of the present invention as in FIG. 10 shortly after a wet weather event. Level of water 303 in channel 301 has dropped to below channel invert 313, while basins 311 contain water 303 that remains stored within impervious boundary 315 until drained via pipes 331.

Figure 13:
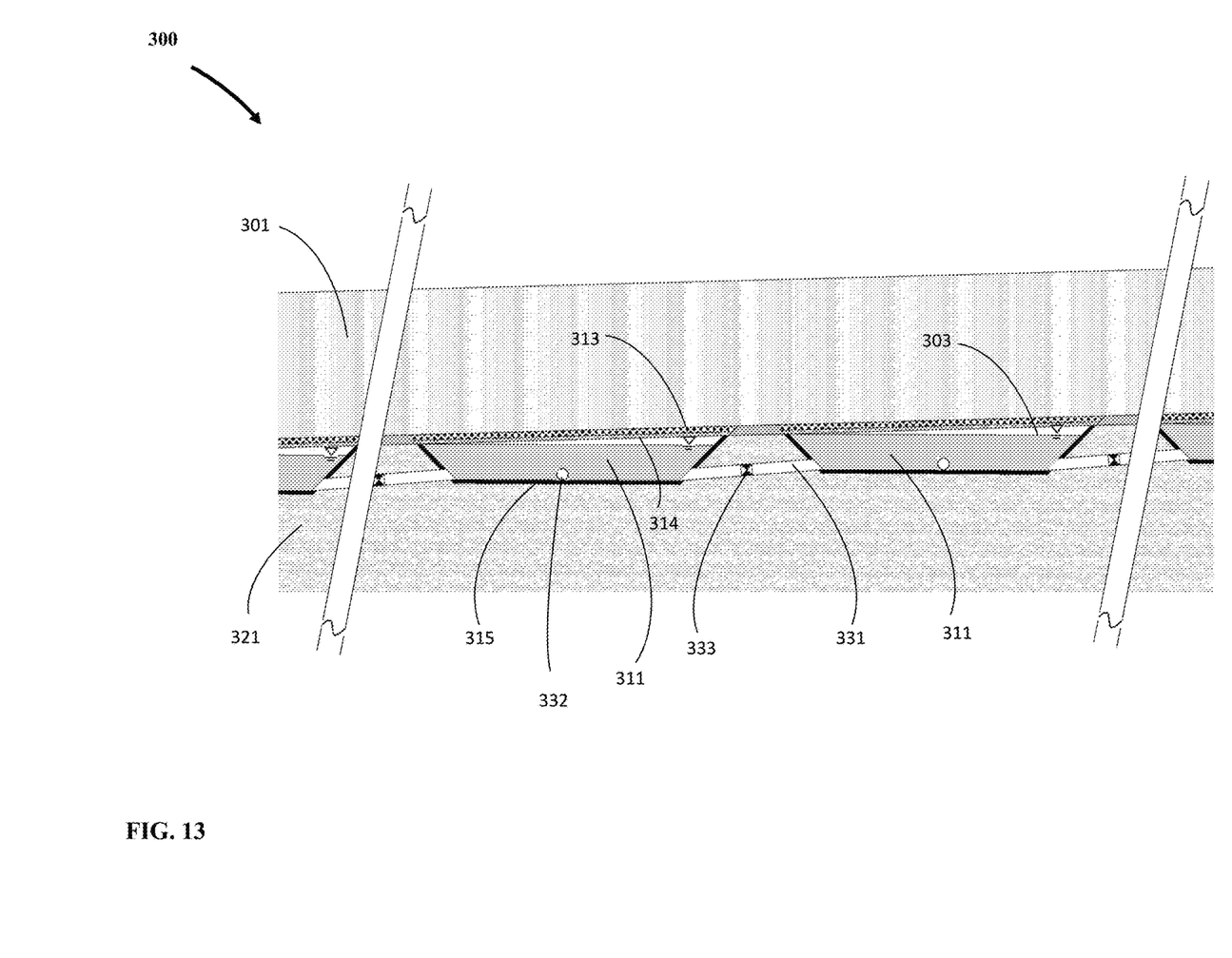
FIG. 13 is a longitudinal profile view of the same embodiment of the present invention as in FIG. 10 shortly after a wet weather event wherein a cascade of separate yet interconnected concrete-box detention basins with impervious liner for stormwater runoff conservation are accommodated below a stormwater channel bed.

FIG. 13 is a longitudinal profile view of the same embodiment 300 of the present invention as in FIG. 10 shortly after a wet weather event wherein a cascade of separate yet interconnected concrete-box detention basins 311 with impervious liner 315 are accommodated below a stormwater channel 301 for stormwater runoff conservation. Longitudinal pipes 331 equipped with flow control devices 333 connect consecutive basins 311 with different bed elevations along channel 301, while adjacent basins with same bed elevation may be connected laterally by level pipes 332. Water 303 remains stored within impervious boundary 315 until drained via pipes 331.

Figure 14:
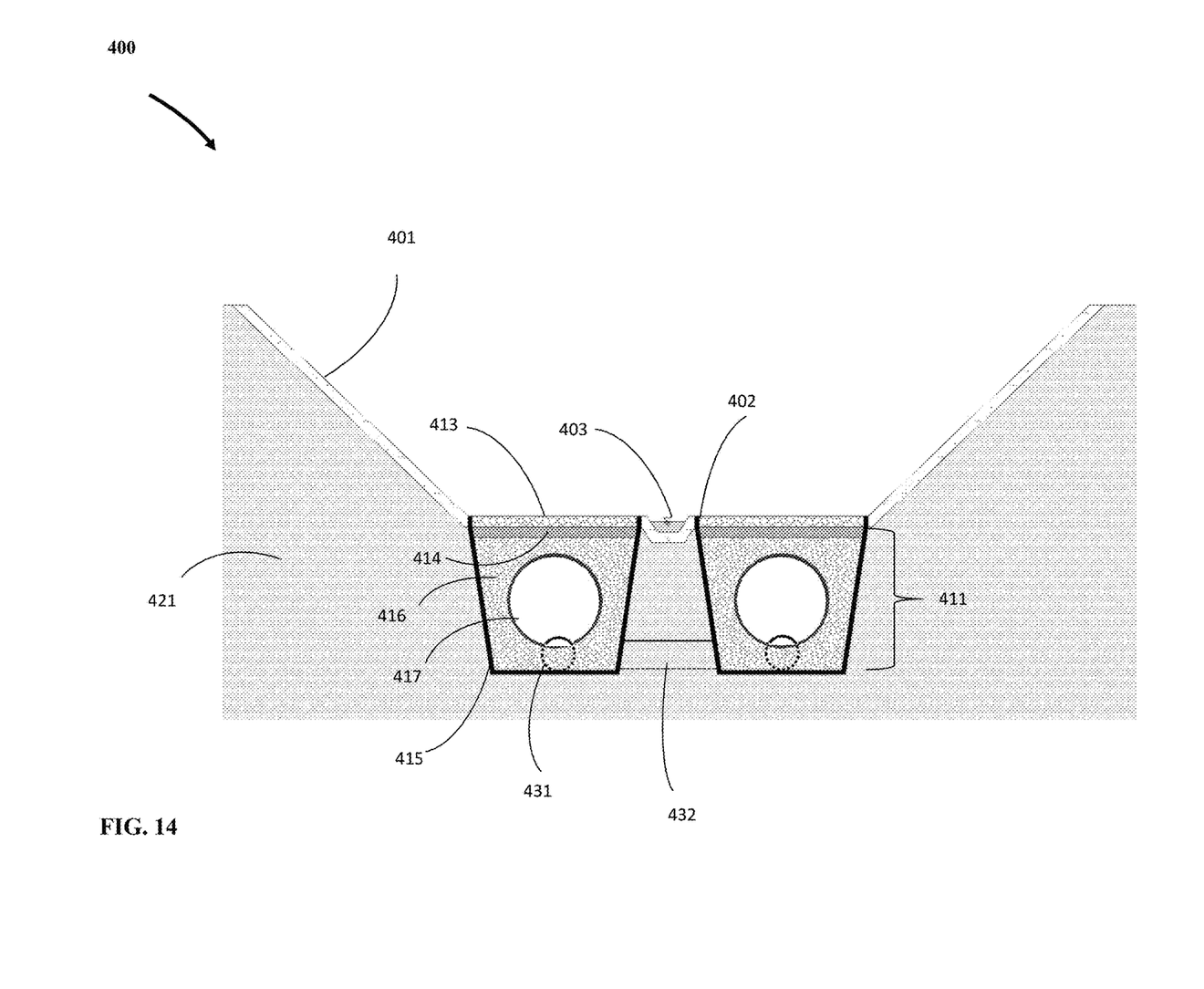
FIG. 14 is a cross section view of another embodiment of the present invention during dry weather conditions wherein perforated pipes with crushed stone backfill in interconnected impervious-parameter excavated trenches are accommodated below a stormwater channel bed to serve as detention basins for stormwater runoff conservation.

FIG. 14 is a cross section view of another embodiment 400 of the present invention during dry weather conditions wherein perforated pipes 417 with crushed stone backfill 416 in excavated trenches with impervious-parameter 415 are accommodated below a stormwater channel bed to serve as detention basins 411 for stormwater runoff conservation. The channel bed 413 over basins 411 is highly pervious and may be comprised of rip rap laid over a graded stone filter bed 414. The stormwater channel may have a low flow channel 402 that conveys water 403 during dry weather conditions, which may be kept isolated from the basins 411 because of water quality concerns. There may be longitudinal pipes 431 equipped with flow control devices (not shown) that connect consecutive basins with different bed elevations along channel 401, while adjacent basins with same bed elevation may be connected laterally by level pipes 432.

The present invention is susceptible to modifications and variations which may be introduced thereto without departing from the inventive concepts and the object of the invention. Basin configurations other than those shown may be used below the channel and non-perforated conduits may be used in lieu of perforated conduits for stormwater conservation without infiltration to avoid the need for lining the basins. When using non-perforated conduits, the means for hydraulic communication with the channel can take a number different shapes and forms that include perforated risers, slotted soffit, et.

While the present invention has been described in connection with what is considered the most practical and preferred embodiments, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

I claim:

1. An apparatus for combined conveyance, detention, and infiltration of stormwater runoff, the apparatus comprising:
   a gravity flow channel disposed to receive and convey stormwater runoff;
   at least one substantially level longitudinal void space accommodated in ground formation below said channel within the plan boundaries and below the bed elevation of said channel to serve as detention-infiltration basin by receiving, and detaining water conveyed by said channel and infiltrating said water into surrounding ground;
   pervious interface between said channel and said basin disposed to provide adequate water flow from said channel into said basin while also serving to filter out fines and debris conveyed along with water in said channel as well as to protect against erosion and degradation;
   permeable interface between perimeter of said basin and surrounding ground disposed to provide adequate infiltration flow of water detained in said basin into surrounding ground while also serving as filter to prevent migration of fines from surrounding ground into the said basin in case of flow reversal due to high groundwater level.

2. An apparatus for combined conveyance and detention of stormwater, the apparatus comprising:
   a gravity flow channel disposed to convey stormwater runoff;
   at least one substantially level longitudinal void space accommodated in ground formation below said channel disposed underground within the plan boundaries and below the bed elevation of said channel to serve as detention basin by receiving and detaining water conveyed by said channel;
   pervious interface between said channel and said basin disposed to provide adequate water flow from said channel into said basin while also serving to filter out fines and debris conveyed along with water in said channel as well as to protect against erosion and degradation;
   impervious interface between said basin and surrounding ground to prevent loss of water detained inside said basin;
   a pipe of adequate size in hydraulic communication with said basin equipped with a flow control device, said pipe and flow control device disposed to drain water from said basin at required flow rate.

* * * * *